United States Patent [19]
Giltzow et al.

[11] 3,805,400
[45] Apr. 23, 1974

[54] COMPASS

[75] Inventors: James Hunter Giltzow, Roseland; James M. Bosland, Wayne, both of N.J.

[73] Assignee: Ketcham & McDougall, Inc., Roseland, N.J.

[22] Filed: May 5, 1971

[21] Appl. No.: 140,417

[52] U.S. Cl. ................................................. 33/364
[51] Int. Cl. ............................................ G01c 17/08
[58] Field of Search .............. 33/364, 346, 350, 355

[56] References Cited
UNITED STATES PATENTS

| | | | |
|---|---|---|---|
| 2,616,187 | 11/1952 | Young | 33/364 |
| 2,803,068 | 8/1957 | Mason | 33/364 |
| 3,217,420 | 11/1965 | Dinsmore | 33/344 |
| 2,295,082 | 9/1942 | Jonas | 33/355 |

FOREIGN PATENTS OR APPLICATIONS

| | | | |
|---|---|---|---|
| 1,505,406 | 11/1967 | France | 33/364 |
| 2,360 | 1866 | Great Britain | 33/364 |
| 1,527,323 | 4/1968 | France | 33/364 |

*Primary Examiner*—Robert B. Hull
*Attorney, Agent, or Firm*—Darby & Darby

[57] ABSTRACT

A compass for mounting on snowmobiles and other vehicles normally subject to vibratory motion is described. The bearing surfaces of compass card pivot and socket members have relatively large radii to substantially reduce relative vertical movement between the pivot and socket members. The pivot and socket members are composed of a relatively soft plastic material in order to absorb and cushion the impact between the compass pivot and socket members.

3 Claims, 1 Drawing Figure

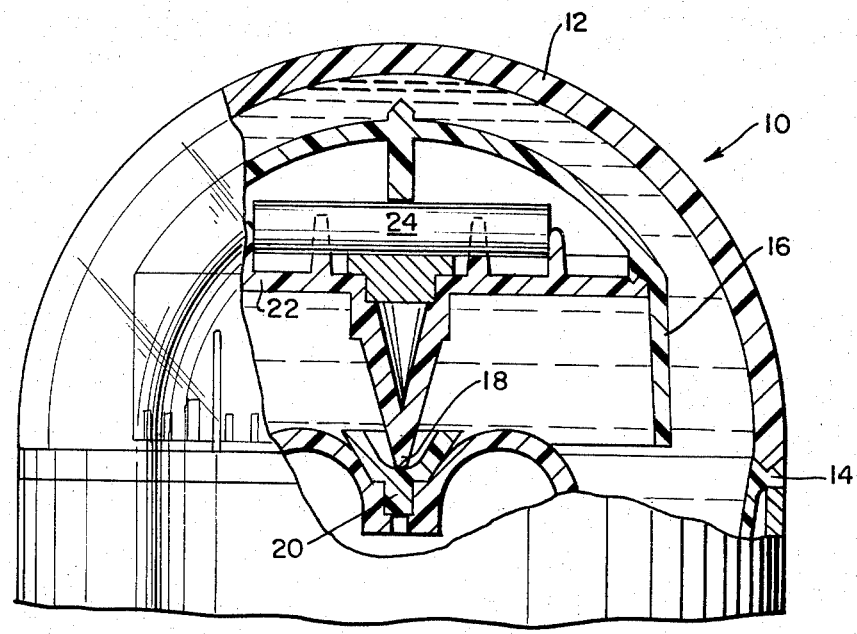

COMPASS

Conventional magnetic compasses heretofore available are not adapted for use with snowmobiles and other vehicles which are constantly subject to vibratory motion during normal use. The vibration induced in or by the vehicle would be transmitted to the directionally marked compass card causing it to spin or oscillate excessively. Constant spinning or oscillating of the compass card during normal operation of the vehicle would, of course, render these conventional compasses useless as directional aids.

The compass described herein is specifically adapted for use on vehicles subject to vibratory motion. During normal operation of such vehicles, the problem of excessive spinning or oscillating of the compass card is eliminated. The compass of this invention has a compass card pivot and socket which are composed of a relatively soft plastic material. The soft plastic material dampens the vibratory motion of the vehicle which would ordinarily be transmitted to the compass card by absorbing and cushioning the impact between the compass card pivot and socket members. In the preferred embodiment of this invention, the plastic material is composed of Cycolac. The non-proprietary name for Cycolac is acrylonitrile-butadiene-styrene. Cycolac is a trademark owned by Borg-Warner Corporation, 200 S. Michigan Avenue, Chicago, Ill. Acrylonitrile-butadiene-styrene has a Rockwell hardness number in the range between 75 on the $R$ scale and 115 on the $R$ scale. Other suitable plastic materials would include polyurethanes which have a hardness number in the range between Shore 48 on the $A$ scale and Shore 80 on the $D$ scale; polyamides such as nylons which have a hardness number in the range between Rockwell 95 on the $R$ scale and Rockwell 120 on the $R$ scale; polyacetals which have a hardness number in the range between Rockwell 78 on the $M$ Scale and Rockwell 94 on the $M$ scale and polyacetals which have a hardness number of Rockwell 120 on the $R$ scale; polyethylenes which have a hardness number in the range between Shore 41 on the $D$ scale and Shore 70 on the $D$ scale, and polystyrenes which have a hardness number in the range between Rockwell 20 on the $M$ scale and Rockwell 90 on the $M$ scale and polystyrenes which have a hardness number in the range between Rockwell 50 on the $R$ scale and Rockwell 100 on the $R$ scale. The plastic material used should have a Rockwell hardness number in the range defined by $R50$ to $R119$. In conventional compasses, the pivot and socket members are composed of relatively hard materials.

Another feature of the compass of this invention is that the radii of the bearing surfaces of the compass card pivot and socket are relatively large. This substantially reduces the relative vertical movement of the compass card with respect to the compass pivot when the compass is subjected to high vibratory motion in the horizontal plane as is common in the operation of snowmobiles and like vehicles. In conventional compasses, the relatively small radii of the compass card pivot and socket holding surfaces causes the pivot to climb the inner wall of the socket when these compasses are subjected to high vibratory motion in the horizontal plane.

Another feature of the compass of this invention is that the compass card is floated over the compass card socket so that there is minimum contact pressure between the compass card pivot and socket thereby minimizing the transmission of vibratory forces to the compass card.

Another feature of the invention is that the flotation of the compass card permits a heavy and therefore more magnetically powerful magnet to be used in the compass. The use of a magnetically powerful magnet is primarily important because the operation of the magnet is less readily affected by the vibrational forces that induce compass card spinning or oscillation. The use of a magnetically powerful magnet is also important in overcoming the greater frictional forces caused by the relatively large radii of the compass card pivot and socket bearing surfaces and causing the compass card to rotate in response to a directional change of the vehicle.

The three above-mentioned features of the compass of this invention serve to reduce spinning or oscillation of the compass card when the compass is mounted on a snowmobile or a similar type vehicle.

It is therefore an object of this invention to provide a compass adapted for use with a snowmobile or other vehicle normally subject to vibratory motion during operation.

It is a further object of this invention to provide a compass which substantially reduces the tendency of the compass card to spin or oscillate when the compass is subjected to vibratory motion.

These and other objects of this invention will be more readily understood and appreciated by reference to the following description and drawing in which:

FIG. 1 is a front elevational view partially cut away of the preferred embodiment of the compass of this invention.

Referring now to FIG. 1, the compass 10 of this invention includes a hemispherical transparent member 12 and a base member 14. The transparent member 12 is attached to the base member 14 so as to form a fluid tight chamber. The base member 14 forms a seat for the compass card socket member 20.

The compass card 16 is generally hemispherical in shape and has directional markings thereon. A horizontal fluid tight platform member 22 is formed on the inside of the compass card. The chamber formed by the platform member 22 and the inner surface of the compass card serves as a housing for the compass magnet 24.

The compass card jewel or pivot 18 extends downwardly from the platform member 22 to the compass card socket member 20.

As previously mentioned, the compass card pivot 18 and the compass card socket member 20 are composed of a relatively soft plastic material. In the preferred embodiment this material is Cycolac. Any other plastic material having a Rockwell hardness number in the approximate range of approximately $R\ 50$ to $R\ 119$ could be used in place of Cycolac.

In the preferred embodiment, the compass card pivot member 18 tapers downwardly from the platform member 22 at an angle of approximately 16° with the vertical to a bearing surface having a radius of approximately 0.045 inches. The radius of this bearing surface is relatively large compared with the bearing surface radii of conventional compass pivot members which are approximately 0.005 inches.

In the preferred embodiment, the socket member 20 tapers downwardly at an angle of approximately 35 degrees with the vertical to a bearing surface having a radius of approximately 0.093 inches.

The radius of this bearing surface is relatively large compared with the bearing surface radii of conventional compass socket members which are approximately 0.010 inches.

The fluid tight chamber formed by transparent hemispheric member 12 and base member 14 is filled with a conventional compass oil. The compass oil serves a dual purpose. Firstly, the compass oil provides a frictional force on the compass card which dampens any rotational movement which is induced in the card. Secondly, the compass oil permits the compass card to be floated in the fluid tight chamber so that there is minimum contact pressure between the bearing surfaces of the compass card pivot member and the compass card socket member. The minimum contact pressure relationship between these bearing surfaces minimizes the transmission of vibrational forces to the compass card.

Since the compass card 16 is floated in the fluid tight chamber of the compass, a heavy and therefore magnetically powerful magnet can be attached to the compass card. In the preferred embodiment the magnet is rated at 1,500 gauss. A powerful magnet is, of course, advantageous in preventing compass card spinning due to vibratory motion.

While the principles of the invention have now been made clear in the illustrative embodiment, there will be immediately obvious to those skilled in the art, many modifications in structure, arrangement, proportions, the elements, materials and components, used in the practice of the invention and otherwise which are particularly adapted for specific environments and operating requirements, without departing from those principles. For example, the compass card of this invention could have a socket member formed on its underside which cooperates with a pivot member attached to the base of the compass. The appended claims are, therefore, intended to cover and embrace any such modifications, within the limits only of the true spirit and scope of the invention.

What is claimed is:

1. In a compass for use with vehicles subject to vibratory motion including a card member having directional markings thereon, a first supporting member, being a pivot, formed on the underside of said card member, and a second supporting member, being a bearing, positioned beneath said first supporting member for receiving said first supporting member, the improvement comprising said first and second supporting members being composed of a plastic material having a hardness number greater than Shore 48 on the $A$ scale and less than Rockwell 120 on the $R$ scale.

2. In a compass for use with vehicles subject to vibratory motion including a card member having directional markings thereon, a first supporting member, being a pivot, formed on the underside of said card member, and a second supporting member, being a bearing, positioned beneath said first supporting member for receiving said first supporting member, the improvement comprising said first and second supporting members being composed of a plastic material having a hardness number in the range between Rockwell 75 on the $R$ scale and 115 on the $R$ scale.

3. The improvement recited in claim 2, said plastic material being acrylonitrile-butadiene-styrene.

* * * * *